3,053,336
BATTERY HOLDING DEVICE
Louis Zednik, Jr., Clawson, Mich., assignor to Chrysler Corporation, Highland Park, Mich., a corporation of Delaware
Filed June 8, 1959, Ser. No. 818,672
5 Claims. (Cl. 180—68.5)

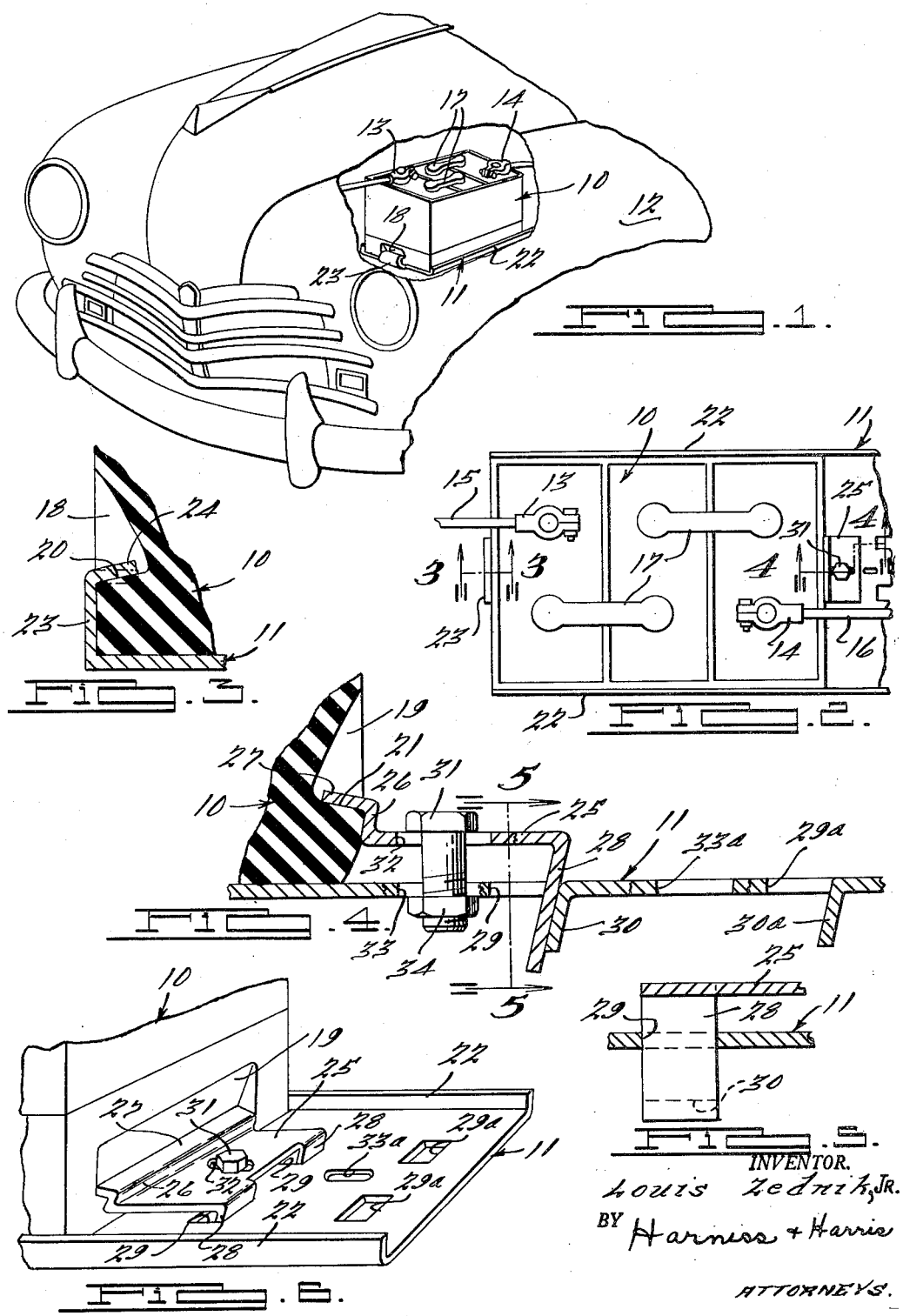

This invention relates to an electric storage battery for automotive vehicles and in particular to improved means cooperable with the battery for clamping the same to the vehicle.

It has been customary heretofore to mount a storage battery within a metal supporting frame secured to the vehicle body, the battery being clamped adjacent its upper edges to the supporting frame. In such a mounting the upper portions of the frame, including the means for clamping the battery to the frame, are subject to the corrosive action frequently encountered adjacent the battery terminals. In consequence the upper portions of the battery mounting acquire an undesirable corroded appearance after a few months service and in some cases eventually become weakened and unserviceable. In addition the proximity of the metal mounting to the battery terminals results in a tendency to short circuit the latter, with a consequent loss of battery power and shortened battery life.

It is accordingly an important object of the present invention to provide an improved battery and means cooperable therewith for clamping the battery in position adjacent its bottom, rather than adjacent its top, thereby to avoid the disadvantages of conventional structures and also to obtain important economies in materials by reducing the size of the battery mounting or supporting frame.

Another and more specific object is to provide an improved mounting for a battery having an indentation in an outer side wall adjacent its base or bottom to provide a shelf at the lower surface of the indenture. A battery supporting tray adapted to be mounted on the vehicle is provided with edge flanges engageable with the other three side walls of the battery adjacent its base. Cooperable with the battery and tray is a bracket having a generally horizontal body terminating inwardly in an upright shoulder adapted to abut the first mentioned side wall below the indentation therein, the shoulder terminating in a clamping portion adapted to overlie the shelf provided by said indentation. The bracket body terminates outwardly in a depending flange which extends through an opening in the tray and declines inwardly in parallelism with a mating flange of the tray at the outer edge of the aforesaid opening in the latter. The two flanges operate to cam the bracket firmly toward the battery when the bracket is clamped downwardly toward the tray and cooperate with the edge flanges of the tray and the shoulder of the bracket to prevent horizontal movement of the battery. A bolt extending vertically through holes in the tray and body of the bracket is tightened by a nut to draw the bracket downwardly in a clamping action, thereby to hold the battery against upward movement by means of the bracket clamping portion overlying the shelf in the lower portion of the battery wall.

Other objects are to provide an improved battery hold-down device of the foregoing character which can be readily employed with conventional batteries, which can be economically manufactured by stamping operations, and which can be readily and quickly assembled to clamp the battery in the desired position.

Other objects of this invention will appear in the following description and appended claims, reference being had to the accompanying drawings forming a part of this specification wherein like reference characters designate corresponding parts in the several views.

FIGURE 1 is a fragmentary perspective view of the front end of an automotive vehicle, with portions broken away to show a battery mounted therein.

FIGURE 2 is a fragmentary enlarged plan view of the battery and supporting tray of FIGURE 1.

FIGURE 3 is a fragmentary enlarged sectional view taken in the direction of the arrows substantially along the line 3—3 of FIGURE 2.

FIGURE 4 is a fragmentary sectional view taken in the direction of the arrows substantially along the line 4—4 of FIGURE 2.

FIGURE 5 is a fragmentary sectional view taken in the direction of the arrows substantially along the line 5—5 of FIGURE 4.

FIGURE 6 is a fragmentary isometric view showing the lower rear portion of the battery and hold-down device therefor.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a battery 10 is illustrated mounted on a tray 11 suitably secured to the body of an automobile 12. In general, the battery is of conventional construction comprising an outer molded hard rubber case and is provided with the usual terminals 13, 14, cables 15, 16, and plate connectors 17. Inasmuch as corrosive matter frequently tends to collect around the battery terminals as aforesaid, the battery 10 and its supporting means differ from conventional structures so as to minimize the possibility of contact between the battery support and the corrosive environment at the upper portion of the battery.

As illustrated in FIGURES 3 and 4, the front and rear outer walls of the battery 10 are formed with recesses or indentations 18 and 19 respectively, adjacent the bottom or base of the battery 10. The lower surfaces 20 and 21 of the indentations 18 and 19 decline outwardly from the battery and comprise load supporting surfaces or shelves for the purpose described below. The tray 11 may comprise a metal stamping having upturned lateral flanges 22 at opposite sides, FIGURES 1 and 6, and an upturned flange 23 at its front end. The latter flange terminates upwardly in an inturned clamping flange 24 which closely overlies the shelf 20 so as to clamp the latter downwardly toward the bottom of the tray 11 when the battery 10 is urged toward the front of the vehicle or leftward in FIGURE 3.

Preferably the flange portions 23 and 24 are formed of resilient material and the angle of inward inclination of flange 24 prior to assembly with the battery 10 is slightly less than the angle of inclination of the shelf 20, as indicated by the phantom position shown in FIGURE 3, so that when the battery 10 is forced leftward in FIGURE 3 until its lower edge engages the upright flange 23, flange 24 will exert a resilient downward clamping action on the upper surface of shelf 20. The recesses 18 and 19 extend substantially the transverse width of the battery, as illustrated in FIGURE 6, and are formed as mirror images of each other to enable mounting of the battery 10 on the tray 11 with either end forward.

A bracket 25 is provided for clamping the lower rear end of the battery and comprises a generally horizontal body portion terminating forwardly in an upright flange or shoulder 26 adapted to abut the boss or lower end wall portion of the battery 10 below shelf 21, FIGURE 4. The shoulder 26 terminates upwardly in a clamping flange 27 directed inwardly with respect to the battery and adapted to overlie the shelf 21 closely when the bracket is clamped in assembled position with the battery 10 and tray 11. The outer end of the bracket 25 terminates in a pair of depending flanges 28 which decline inwardly and extend through a corresponding pair of openings 29 located immediately inwardly of a pair of depending flanges 30 defining the outer edges of holes 29.

Preferably the bracket 25 and tray 11 are formed by stamping operations from sheet metal, whereby the flanges 30 are lanced from the tray 11 to provide openings 29. As indicated in FIGURES 4 and 6, the flanges 28 and 30 decline inwardly in parallelism with each other and serve to cam the bracket 25 inwardly toward the battery 10 when the bracket 25 is forced downwardly in a clamping action. The clamping action is accomplished by a bolt 31 extending downwardly through mating elongated holes 32 and 33 in the bracket 25 and tray 11 respectively. The bolt 31 is provided with an enlarged upper head which cannot pass through hole 32 and is drawn downwardly by a nut 34 screwed tightly on its lower end below hole 33. The holes 32 and 33 are elongated lengthwise to enable limited adjustment of the bracket and hole 33 is dimensioned so that nut 34 cannot pass therethrough.

Where desired, a single opening 29 and a single depending flange 28 can be employed in place of the paired holes 29 and flanges 28 illustrated. In order to accommodate a battery of a different length but having the same width as the battery 10, an additional set of holes 29a, 33a and flange 30a are provided in tray 11 outwardly of the corresponding holes 29, 33, and flange 30. Such a structure is feasible because automobile batteries are manufactured to a standard width and in two standard lengths depending upon the output of the battery.

In operation of the structure described, prior to clamping the bracket 25 in position, the battery 10 is assembled on the tray 11 by first tilting its rear end upwardly and sliding the forward shelf 20 underneath the bracket 24. Thereafter the bottom of the battery is seated on the tray 11 and the bracket 25 is assembled with its flange 27 overlying shelf 21 and with the flanges 28 extending through openings 29. The bolt and nut assembly 31, 34 is then tightened to draw the bracket 25 downwardly toward the tray 11 and in the same action cam the bracket 25 forwardly or inwardly toward the battery 10 by the interaction of the inclined flanges 28 and 30. Thus the shoulder 26 is forced firmly against the boss of the battery underlying shelf 21. Also as the bracket 25 is clamped downwardly, the inward inclination of the shelf 21 and flange 27 urges the battery 10 forward to assure abutment of flanges 23 by the forward boss of the battery below shelf 20.

Although flanges 23 and 24 are illustrated at the forward end of the battery 10, a second bracket assembly similar to the bracket 25 can be employed to clamp the front end of the battery in position. In such instances, the tray 11 will be formed at its front end to provide structure comparable to the openings 29, 33, and flange 30.

I claim:
1. In a device for clamping an automobile battery adjacent its base in position with respect to the automobile body, a battery tray for receiving the base of said battery and adapted to be secured to said body, said tray having an opening at a location adjacent and spaced outwardly from one end of said base when the latter is located on said tray, a bracket having a portion adapted to overlie a boss on said battery and having a depending flange removably insertable into said opening, said flange declining inwardly and being engageable with a portion of said tray defining an outer edge of said opening to cam said bracket inwardly toward said battery when said bracket is clamped downwardly toward said tray to force said flange into said opening, said flange being movable downwardly into said opening and toward said battery until said movement is limited by abutment between said bracket and battery, and means for clamping said bracket downwardly toward said tray.

2. In a device for clamping an automobile battery adjacent its base in position with respect to the automobile body, a battery tray for receiving the base of said battery and adapted to be secured to said body, a bracket adapted to overlie a boss on said battery, said bracket and tray having interengaging cam portions cooperable to cam said bracket inwardly toward said battery when said bracket is clamped downwardly toward said tray, the cam portion on said tray comprising an outer edge of an opening through said tray, the cam portion on said bracket being movable downwardly into said opening and toward said battery until said movement is limited by abutment between said bracket and battery when said bracket is clamped downwardly toward said tray, and means for clamping said bracket downwardly toward said tray and tightly against said battery.

3. In a device for clamping an automobile battery adjacent its base in position with respect to the automobile body, a battery tray for receiving the base of said battery and adapted to be secured to said body, said tray having a flange lanced therefrom to provide an opening at a location adjacent and spaced outwardly from one end of said base when the latter is located on said tray, said flange depending from the outer edge of said opening and declining inwardly, a bracket having a portion adapted to overlie a boss on said battery and having a depending flange removably insertable into said opening, the last named flange declining inwardly in parallelism with the first named flange and engaging the latter to cam said bracket inwardly toward said battery when said bracket is clamped downwardly toward said tray to force said last named flange into said opening, said flange being movable downwardly into said opening and toward said battery until said movement is limited by abutment between said bracket and battery, and means for clamping said bracket downwardly toward said tray.

4. In a device for clamping an automobile battery adjacent its base in position with respect to the automobile body, a battery tray for receiving the base of said battery and adapted to be secured to said body, said tray having a flange lanced therefrom to provide an opening at a location adjacent and spaced outwardly from one end of said base when the latter is located on said tray, said flange depending from the outer edge of said opening and declining inwardly, a generally horizontal bracket terminating in one direction in an upright shoulder adapted to abut an end wall portion of said battery, said shoulder terminating in a portion directed in said one direction and adapted to overlie a shelf portion of said battery adjacent said wall portion, said bracket terminating oppositely from said one direction in a depending flange removably insertable into said opening, the last named flange declining in said one direction and cooperating with the first-named flange to cam said bracket toward said battery when said bracket is clamped downwardly toward said tray, to force said last named flange into said opening, said flange being movable downwardly into said opening and toward said battery until said movement is limited by abutment between said bracket and battery, and means for clamping said bracket downwardly toward said tray.

5. In combination with a battery for an automotive vehicle, a shelf provided by an outer wall of said battery adjacent the base thereof, a tray for receiving said base and adapted to be secured to said vehicle, said tray having an opening therethrough, the outer edge of said opening defining an inclined cam portion adjacent and spaced outwardly from said shelf, a bracket having a shoulder abutting said wall below said shelf and also having a portion overlying said shelf in supporting relation, said bracket also having an inclined cam portion engaging the first named cam portion to cam said shoulder inwardly toward said battery wall when said bracket is clamped downwardly toward said tray, the second named cam portion being movable downwardly into said opening and toward said battery until said movement is limited by abutment between said bracket and battery when said bracket is clamped downwardly toward said tray, and means for clamping said bracket downwardly toward said tray.

References Cited in the file of this patent

UNITED STATES PATENTS

| | | |
|---|---|---|
| 2,520,725 | Judd | Aug. 29, 1950 |
| 2,627,385 | Tinnerman | Feb. 3, 1953 |
| 2,678,798 | Churchill | May 18, 1954 |
| 2,947,373 | Wilson | Aug. 2, 1960 |